(12) United States Patent (10) Patent No.: US 9,361,605 B2
Yablokov et al. (45) Date of Patent: Jun. 7, 2016

(54) SYSTEM AND METHOD FOR FILTERING SPAM MESSAGES BASED ON USER REPUTATION

(75) Inventors: Victor V. Yablokov, Moscow (RU); Anton V. Tikhomirov, Moscow (RU); Vladislav V. Martynenko, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 356 days.

(21) Appl. No.: 13/484,449

(22) Filed: May 31, 2012

(65) Prior Publication Data

US 2013/0268470 A1 Oct. 10, 2013

(30) Foreign Application Priority Data

Apr. 6, 2012 (RU) ................................ 2012113256

(51) Int. Cl.
| | | |
|---|---|---|
| *G06E 1/00* | (2006.01) | |
| *G06E 3/00* | (2006.01) | |
| *G06F 15/18* | (2006.01) | |
| *G06Q 10/10* | (2012.01) | |
| *G06N 3/063* | (2006.01) | |
| *G06N 3/02* | (2006.01) | |
| *G06N 3/08* | (2006.01) | |
| *G06N 3/04* | (2006.01) | |

(52) U.S. Cl.
CPC .............. *G06Q 10/107* (2013.01); *G06N 3/02* (2013.01); *G06N 3/049* (2013.01); *G06N 3/0454* (2013.01); *G06N 3/063* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,249,162 B2 | 7/2007 | Rounthwaite et al. | |
| 7,373,385 B2 | 5/2008 | Prakash | |
| 7,496,960 B1 * | 2/2009 | Chen et al. | 726/22 |
| 7,836,061 B1 | 11/2010 | Zorky | |
| 7,854,007 B2 * | 12/2010 | Sprosts et al. | 726/24 |
| 7,937,468 B2 | 5/2011 | Libbey | |
| 7,941,490 B1 * | 5/2011 | Cowings | 709/206 |
| 8,042,181 B2 * | 10/2011 | Judge | 726/22 |

(Continued)

FOREIGN PATENT DOCUMENTS

RU 85247U1 U1 7/2009

OTHER PUBLICATIONS

Search report in RU 2012113256/08, dated Aug. 6, 2013.
(Continued)

*Primary Examiner* — Kakali Chaki
*Assistant Examiner* — Ababacar Seck
(74) *Attorney, Agent, or Firm* — Bardmesser Law Group

(57) ABSTRACT

System for updating filtering rules for messages received by a plurality of users including a filtering rules database storing filtering rules for the users; means for distributing the filtering rules to the users; a user reputation database comprising a reputation weight for each user; and means for receiving and processing of user reports that indicate that a message belongs to a particular category. The means for receiving (i) calculates a message weight in its category based on a number of reports received from multiple users and a reputation weights of those users, (ii) decides whether the message belongs to the particular category if the message weight exceeds a predefined threshold, (iii) updates the filtering rules in the filtering rules database based on the deciding, and (iv) distributes the updated filtering rules from the filtering rules database to the users using the means for distributing.

29 Claims, 10 Drawing Sheets

(56) References Cited

U.S. PATENT DOCUMENTS

| | | | |
|---|---|---|---|
| 8,185,956 B1* | 5/2012 | Bogorad et al. | 726/25 |
| 8,479,051 B2* | 7/2013 | Yuan et al. | 714/38.1 |
| 8,582,567 B2* | 11/2013 | Kurapati et al. | 370/356 |
| 8,635,690 B2* | 1/2014 | Alperovitch et al. | 726/22 |
| 8,635,695 B2* | 1/2014 | Zuk et al. | 726/23 |
| 8,839,417 B1* | 9/2014 | Jordan | 726/22 |
| 2004/0177110 A1 | 9/2004 | Rounthwaite | |
| 2006/0182029 A1 | 8/2006 | Kealy et al. | |
| 2006/0288076 A1* | 12/2006 | Cowings et al. | 709/206 |
| 2007/0156696 A1* | 7/2007 | Lim | 707/9 |
| 2009/0119740 A1* | 5/2009 | Alperovitch et al. | 726/1 |
| 2009/0216847 A1* | 8/2009 | Krishnaswamy et al. | 709/206 |
| 2010/0005149 A1* | 1/2010 | Yu | 709/206 |
| 2010/0125911 A1 | 5/2010 | Bhaskaran | |
| 2010/0153394 A1* | 6/2010 | Wood | 707/737 |
| 2011/0173677 A1 | 7/2011 | Tarbotton et al. | |
| 2011/0246584 A1 | 10/2011 | Vitaldevara et al. | |

OTHER PUBLICATIONS

Elena Zheleva et al., Trusting Spam Reporters: A Reporter-Based Reputation System for Email Filtering, ACM Transactions on Information Systems, vol. 27, No. 1, Article 3, Dec. 2008.

Search report in EP 12181649.0 dated Jul. 1, 2014.

* cited by examiner

SYSTEM AND METHOD FOR FILTERING SPAM MESSAGES BASED ON USER REPUTATION

CROSS-REFERENCE TO RELATED APPLICATION

The present application claims priority to Russian Patent Application No. 2012113256, filed Apr. 6, 2012, which is incorporated herein by reference in its entirety.

BACKGROUND OF THE INVENTION

1. Field of the Invention

The present invention is related to a system and method for filtering messages, and more particularly, to filtering messages based on user reports.

2. Description of the Related Art

Any Internet user is familiar with SPAM. SPAM is often a number one choice of unscrupulous advertisers due to its low costs. Recent studies have shown that SPAM takes up to 80% of all the mail traffic on the Internet. Generally, SPAM is a mass mailing of commercial or other ads to recipients who do not desire to receive them. Originally, SPAM was mainly related to emails. However, currently SPAM is sent over Instant Messengers, web sites, social networks, blogs, web forums, as well as, SMS and MMS messages.

Consequently, SPAM has become a serious technical and economic problem. Large volumes of SPAM increase the load on data channels and increase Internet traffic that has to be paid for by users. Also, people waste productive work time on sorting out SPAM. Furthermore, SPAM is becoming less commercial and is often used for Internet fraudulent schemes due to anonymity of the SPAM messages. Also, SPAM can be used for delivering malware.

SPAM is often used for financial schemes (such as, for example, "Nigerian letters") that attempt to gain user credit card numbers or passwords to on-line banking systems. Phishing schemes and malware delivery are other examples of how SPAM can be used. Therefore, means for protection from SPAM are needed. A number of methods for dealing with SPAM exist. For example, a black list approach uses black lists to block messages that come from the addresses marked in the black list. While this method provides for 100% blocking of the message coming from black-listed addresses, it can result in many false-positives, because some legitimate addresses also get on the black list.

Another anti-SPAM method uses technology that detects identical (or almost identical) messages in a mass mail stream. An effective mass mail analyzer requires very large volumes of mails. Therefore, this method can only be used by very large mail providers. An obvious shortcoming of this method is that most legitimate services (for example, subscriptions to news and updates) also use mass mailings and can be mistaken for sources of SPAM.

Yet another anti-SPAM method is checking of message headers. This method blocks messages that have some typical mistakes in their headers, which indicate robot-generated SPAM messages. A shortcoming of this method is that its effectiveness decreases as the SPAM generating robots improve and make fewer mistakes in the headers.

Another anti-SPAM method is a grey list method. A rejection with a special error code is generated for each incoming message. Then, the SPAM-sending robot, unlike standard mail servers, does not attempt to send the same message again. This is used as criteria for determining legitimate messages. If a sender repeats an attempt to send a message within a certain time period, the message is allowed and the sender is placed into a white list. However, this solution is not acceptable for many users, as delivery of all of the messages is delayed.

Yet another anti-SPAM method is content filtering that uses special SPAM-filters, which analyze all parts of the incoming messages (including graphical ones). The analysis allows forming a SPAM lexical vector or to calculate SPAM weight of a message. Based on these parameters, a SPAM or no-SPAM verdict is made. Such an anti-SPAM method is disclosed in the U.S. Pat. No. 7,836,061, entitled "Method and system for classifying electronic text messages and spam messages."

The SPAM filters are configured in anti-SPAM labs that create and perfect the filtering rules. Since the SPAM senders constantly attempt to overcome the protections created by the SPAM filters, the process of modifying and perfecting the filtering rules is also continuous. Effectiveness of the SPAM filters depends on timely updates of the filtering rules.

As discussed above, conventional anti-SPAM methods do not provide a solution that allows for blocking all SPAM messages with a 100% effectiveness. Accordingly, it is desirable to have an effective anti-SPAM solution that not only uses automated filtering rules updates, but updates the filtering rules based on statistics produced by a large number of SPAM recipients.

US Patent Publication No. 2010/0153394 discloses updating filtering rules based on user reports. Messages are checked by a SPAM filter located on a mail server and delivered to users. Each user can sent a report about SPAM messages to the server. The SPAM filtering rules are changed based on the user reports, so the next time the reported messages are detected, they are blocked. In some implementations, a database of user reputations is used for changing the filtering rules. In order to change the filtering rules based on a user report, the system determines the user reputation. The user reputation can be increased or decreased depending on accuracy and reliability of user's SPAM reports.

U.S. Pat. No. 7,373,385 discloses a method for SPAM identification based on user reports. All email users are connected to a common anti-spam system. When users receive SPAM, they can report it to the system. Then, each email is assigned a rating based on a number of reports and reliability coefficient of each reporting user. The rating is compared to a threshold value, and a SPAM verdict is produced. User reliability coefficient is calculated based on the user report statistics. If a user sends unreliable reports, his reliability coefficient is reduced and his reports are not taken into consideration when email rating is calculated.

U.S. Pat. No. 7,937,468 is intended for reducing the time needed for SPAM verdict based on user reports. A system determines if a message contains SPAM using statistic analysis of the earliest user reports and estimated common reports that are based on the earliest user reports. The verdict is made based on this estimation and user reputation.

US Patent Publication 2004/0177110 discloses a method for teaching SPAM filters using user reports. A user determines if a message contains SPAM and reports it. The SPAM filtering rules are modified based on the user reports. The invention includes cross reference checks of users and elimination of the users who do not pass the check.

The conventional systems increase the effectiveness of filtering by taking into account an opinion of each individual user based on users' reputation. The users' reputation is calculated based on statistics of reliability of user reports. While this approach is effective, it has certain shortcomings. First, users who report SPAM for the first time have low reputation regardless of their actual knowledge and expertise. Second, in order to estimate a real level of user expertise, a reliability statistics need to be collected for this user. This requires a large number of user reports, which takes a long time, especially when the user deals with the relatively "clean" messages that have passed through the initial automated filtering.

Therefore, all of the conventional systems have one major shortcoming—user differentiation that does not allow for making true judgments or accurate estimations of the actual user knowledge and expertise. Accordingly, there is a need in the art for a system and method that allow for in-depth comprehensive estimation of user knowledge that provides for more efficient message filtering.

SUMMARY OF THE INVENTION

The present invention is related to a system and method for detection of SPAM, and more particularly, to filtering messages based on user reports and reputation that substantially obviates one or several of the disadvantages of the related art.

In one aspect of the invention, a system and method that allow for in-depth estimation of user knowledge are provided. A number of clients use a cloud service. The cloud service system provides for more efficient message filtering based on user reputation. The most competent users that have the best reputation within the cloud service system are determined. The SPAM reports are received from these users into a filtering rules modification system. The rules are updated and provided to all users of the cloud service.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method and system for detecting SPAM based on user reports is provided. According to the proposed method, user reputations are determined and user SPAM reports are used for comprehensive SPAM detection. The SPAM filtering rules are perfected and modified based on user reports and provided to all user of the cloud service.

Figure 1:
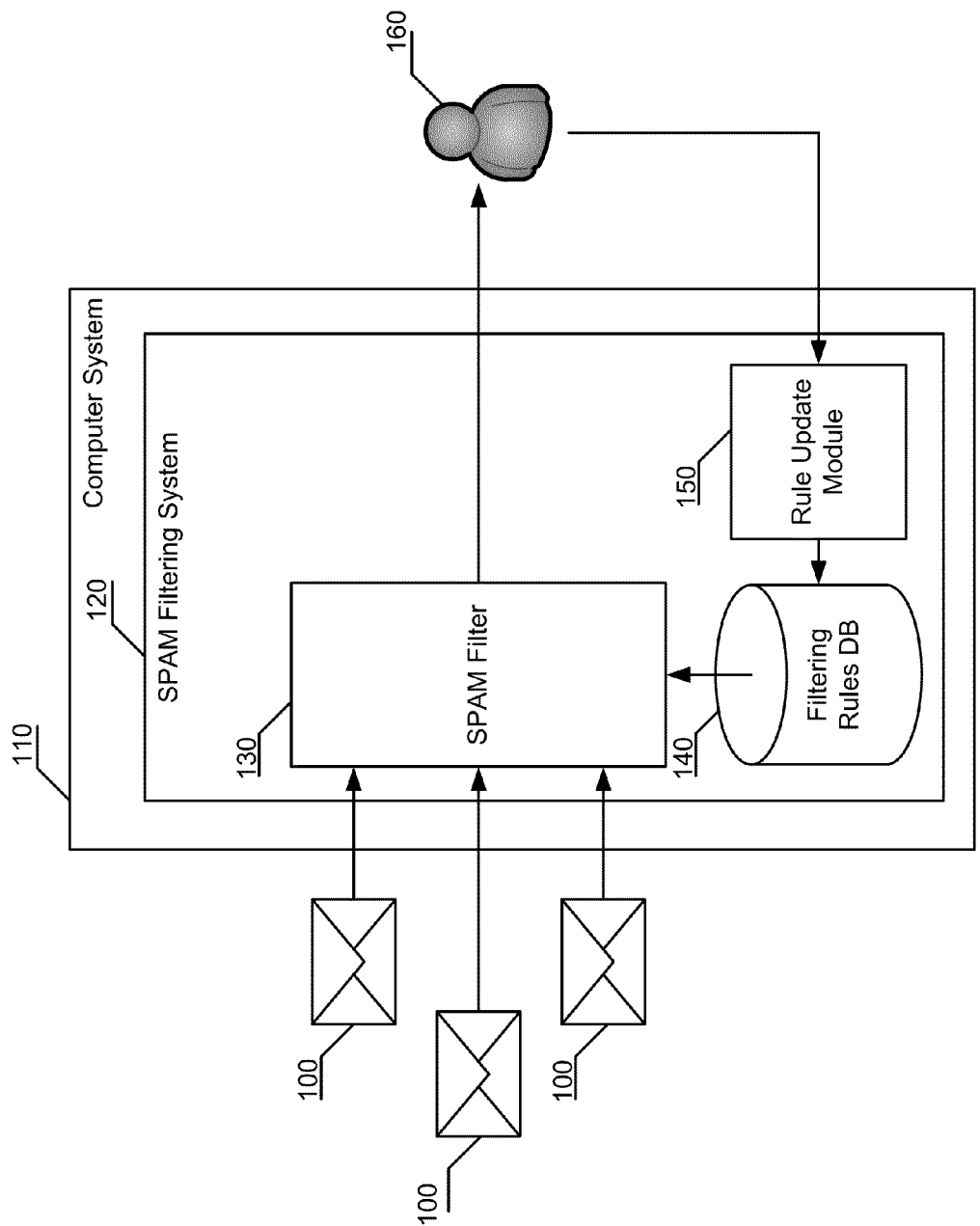
FIG. 1 depicts a simple spam filtering system, in accordance with the exemplary embodiment.

FIG. 1 illustrates a simple SPAM filtering system, in which the filtering rules are set by a user 160. Messages 100 (e.g., emails, SMS or MMS messages) are received into a SPAM filter 130 of a SPAM filtering system 120, which is installed on a computer system 110 of the user 160. According to the exemplary embodiment, a computer system 110 can be a PC or a mobile device (e.g., a notebook, a tablet or a mobile phone). The SPAM filter 130 determines parameters of received messages 100 and checks these parameters against parameters stored in a filtering rules database 140. If the parameters of the message 100 match the parameters from the database 140, a certain action is taken against the message 100 (for example, placing the message into quarantine, or deletion of the message).

If a match is not found, the message 100 is sent to the user 160. However, if the message 100 containing SPAM is not detected by the SPAM filtering system 120 and the message is sent to the user 160, the user 160 can change filtering rules in the database 140 by rule update module 150. Thus, the same or similar SPAM message will not pass through the SPAM filter 130 in the future.

Since most of the SPAM comes through mass mailings, statistics of SPAM messages received and processed by a large number of users can be collected. According to the exemplary embodiment, users are given an opportunity to send SPAM reports to a central processing system. The central processing system analyzes the reports and changes the filtering rules of the SPAM filtering system 120 on all user computers 110.

Figure 2:
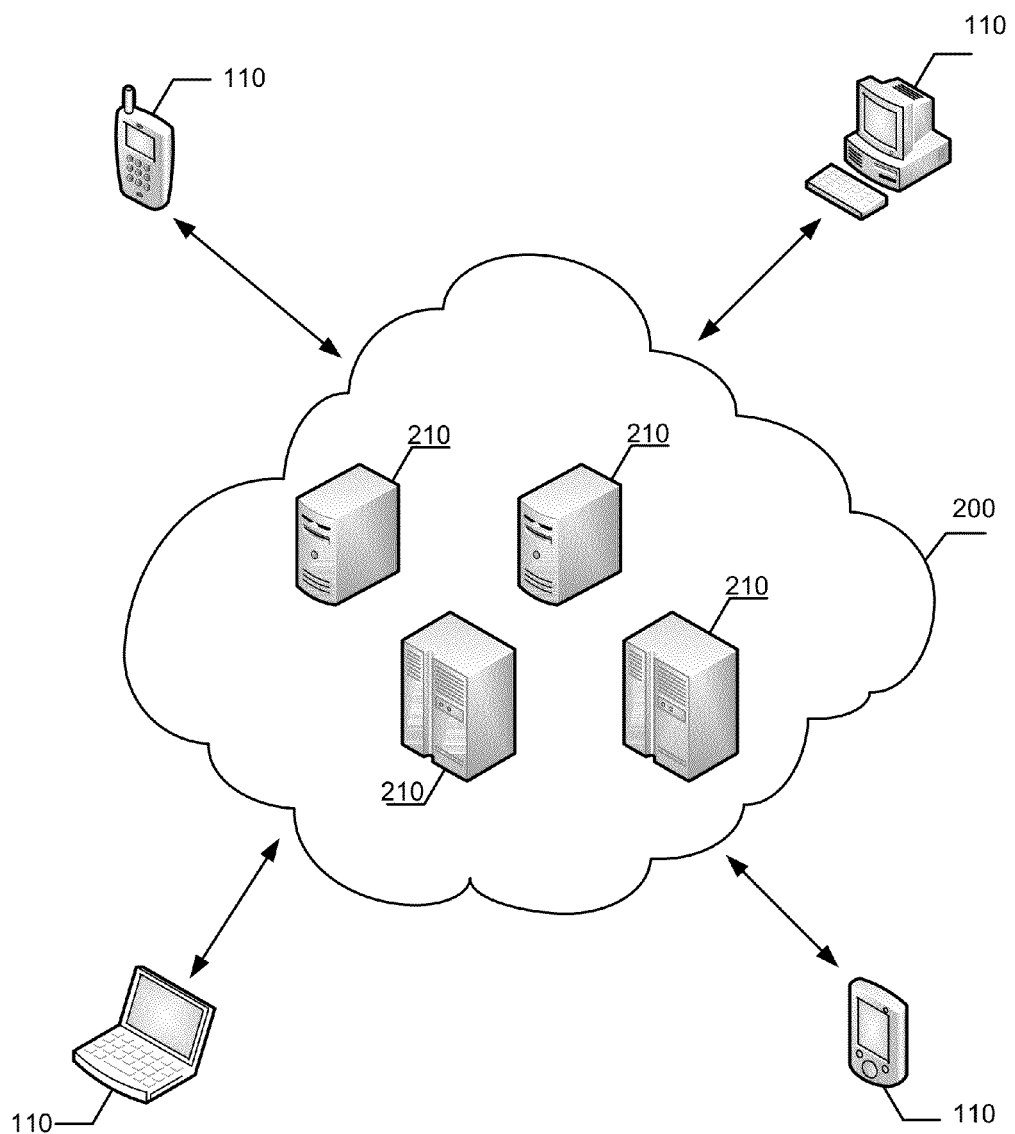
FIG. 2 illustrates a cloud service used in the exemplary embodiment.

Thus, when a part of a group of users receives identical SPAM messages and reports them to the central processing system, update of the filtering rules of the SPAM filtering system 120 on all user computers 110 guarantees that the rest of the group will not receive the same SPAM messages. According to the exemplary embodiment, the central processing system is implemented as a cloud service depicted in FIG. 2.

A cloud service 200 is illustrated as hardware resources (servers) 210 that are made available to users of computers 110. A plurality of resources 210 makes client-server system more accessible due to scalability under high loads. This also decreases the risk of failure of a Virtual (VS) Server, if one of the resources 210 fails, because the VS can be automatically connected to a backup source.

Figure 3:
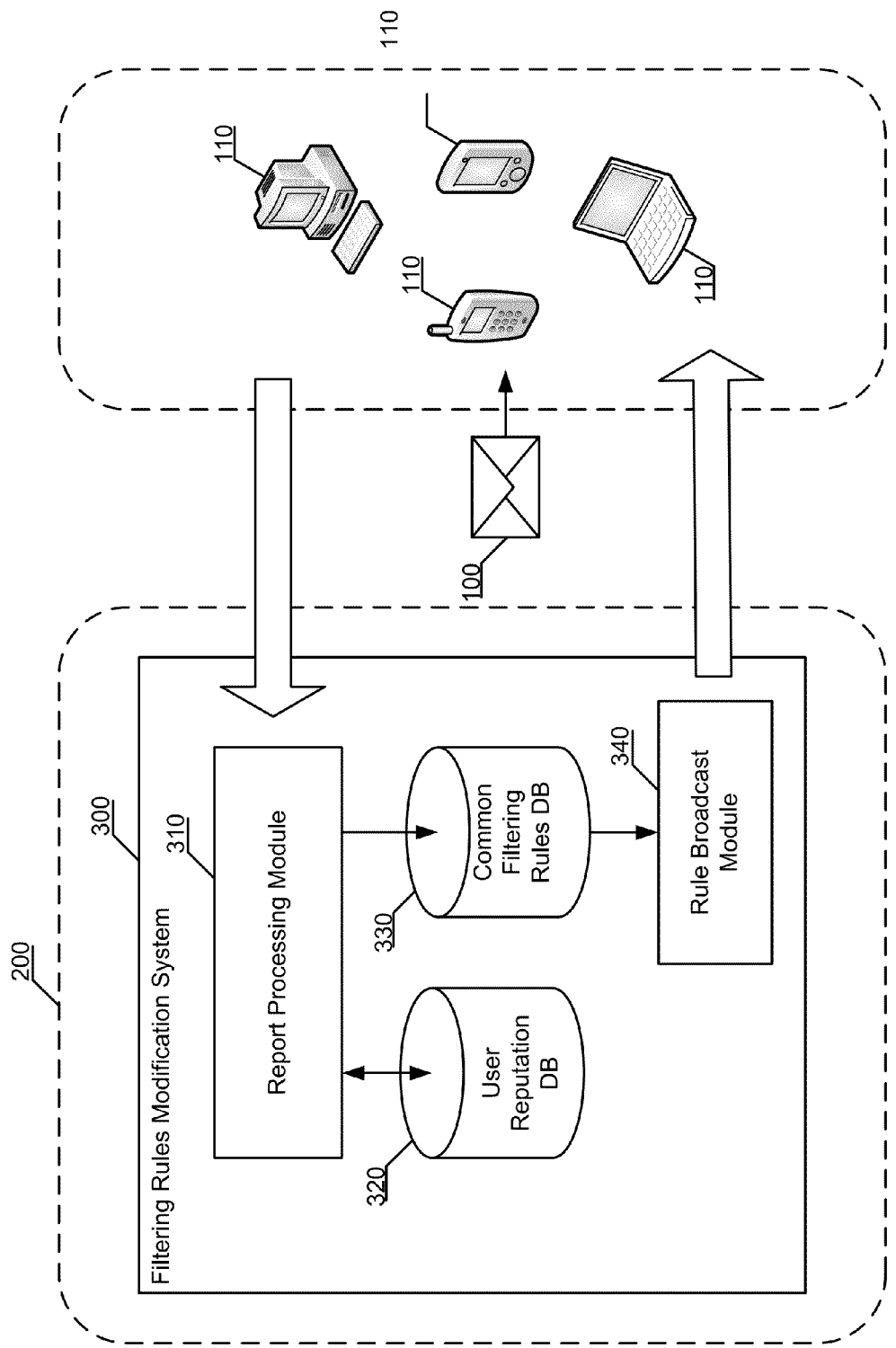
FIG. 3 illustrates architecture of filtering rules modification system, in accordance with the exemplary embodiment.

FIG. 3 illustrates architecture of filtering rules modification system in accordance to the exemplary embodiment. The filtering rules are perfected and modified based on user reports. Each user of the computer systems 110, which act as clients of the cloud service 200, can send a SPAM detection report to a filtering rules modification system 300. The SPAM reports are discussed in detail below in the description of FIG. 5. The filtering rules modification system 300 is a part of the cloud service 200. The user reports are received into a report processing module 310 within the filtering rules modification system 300.

The report processing module 310 calculates a SPAM weight of each reported message. The SPAM weight of a message is calculated based on a number of SPAM reports received for this message, as well as, based on a reputation weight of each reporting user. The reputation weight reflects user knowledge and reliability. The reputation weight is calculated for each user in order to categorize all users based on their knowledge and reliability of the reports. The reputation weights for all clients of the cloud service are stored in a user reputation database 320.

According to the exemplary embodiment, the SPAM reports from the users having high reputation weight increase message SPAM weight to a higher degree than of those with the lower reputation weight. In one embodiment, a reputation weight threshold can be set, so that the reports received from the users having reputation weight lower than the threshold are not taken into consideration for calculation of the message SPAM weight. Optionally, reputations that are higher than the threshold can be given a weight based on the value of the reputation (e.g., all users with reputations below 50, out of a possible 100, are ignored for purposes of calculation of SPAM weight, while a user with a reputation of, e.g., 51, has a lower weight, for purposes of calculation, than a user with a reputation of 95).

According to the exemplary embodiment, calculation of the message SPAM weight based on a number of user SPAM reports and on reputation weight of each reporting user is performed according to a special algorithm. This algorithm can use fuzzy logic, emulation, neural networks, base vector method (see, e.g http:en.wikipedia.org/wiki/Support_vector_machine), etc. After the SPAM weight of a message is calculated, its value is compared against a pre-set threshold. Based on the comparison, the report processing module 310** produces a SPAM verdict.

Then, based on the SPAM verdict, the report processing module 310 updates a common rules filtering database 330. The common rules filtering database 330 contains parameters of the messages with a category assigned to them based on the SPAM verdict. Subsequently, a rule broadcast module 340 sends updated filtering rules from the common filtering rules database 330 to all user computer systems 110. Thus, the updated filtering rules from the common rules filtering database 330 are migrated to the filtering rules databases 140 on user computer systems 110.

Furthermore, if a number of users report a certain message as SPAM, but the report processing module 310 produced no SPAM verdict, the report processing module 310 updates user reputation database 320 in order to reduce the reputation weight of each user who sent an unreliable SPAM report. Likewise, if the report processing module 310 produced a SPAM verdict, report processing module 310 updates user reputation database 320 in order to increase the reputation weight of each user who sent a reliable report.

Figure 4:
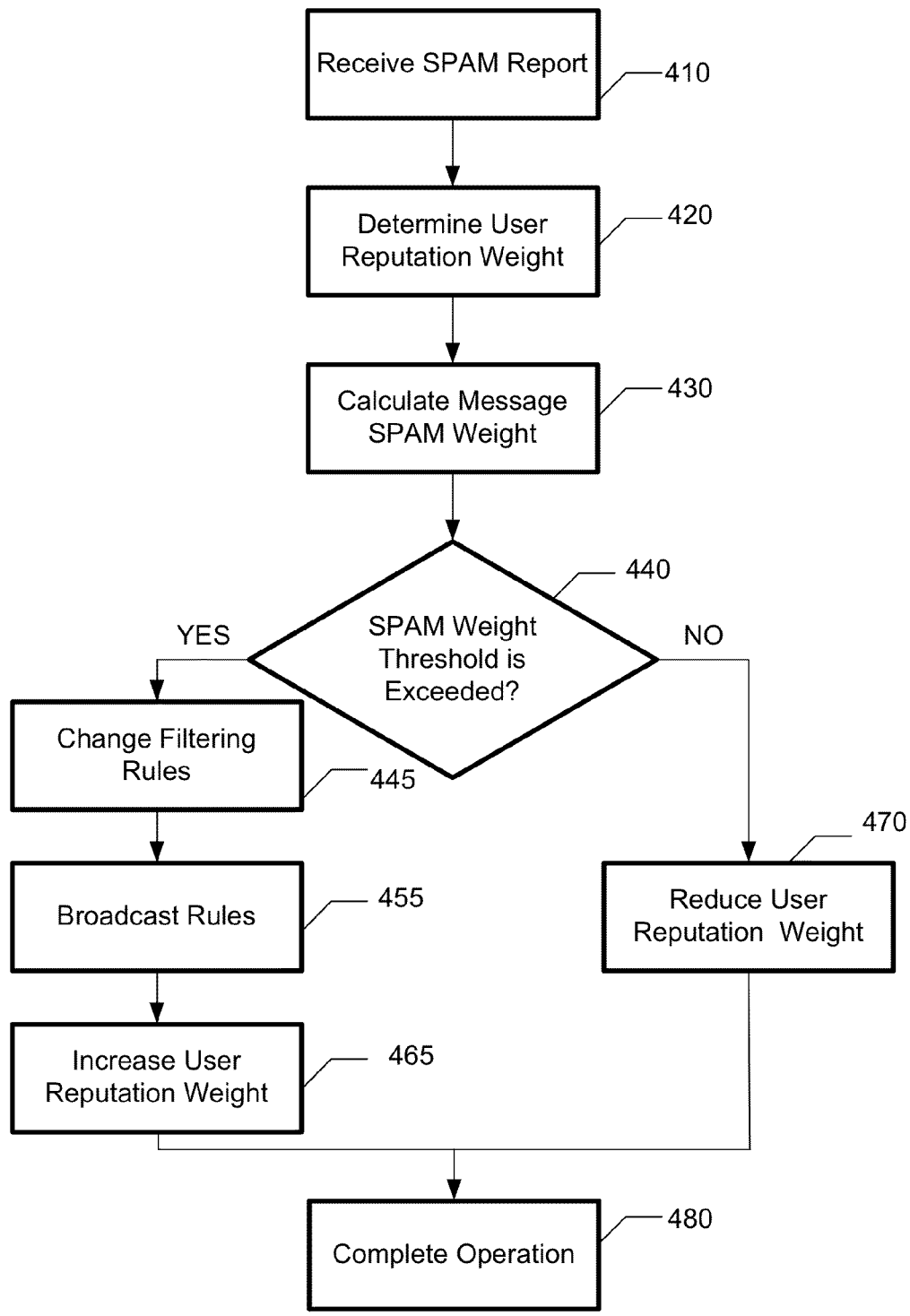
FIG. 4 illustrates an algorithm of a method for filtering rules modification based on user reports, in accordance with the exemplary embodiment.

FIG. 4 illustrates an algorithm of a method for filtering rules modification based on user reports, in accordance with the exemplary embodiment. A SPAM report is received from a user in step 410. A user reputation weight is determined in step 420. A message SPAM weight is calculated in step 430 based on the multiple user's reputation weights (for those users who submitted reports regarding that particular message), as well as based on a total number of the SPAM reports. If, in step 440, the SPAM weight threshold is exceeded, filtering rules are changed in step 445 and broadcasted to users in step 455. Subsequently, the user reputation weight is increased in step 465. If, in step 440, the SPAM weight threshold is not exceeded, the user reputation weight is reduced in step 470. The operation is completed in step 480.

Note that in the exemplary embodiment, SPAM is used as one of possible message categories. However, the filtering rule modification algorithm can be used with other categories of filtered messages. Alternatively, a system can have two categories of messages—SPAM messages and trusted messages. A user report, indicating message as SPAM, will increase the SPAM weight of this message and decrease the weight of this message if the message belongs to the trusted message category.

In addition to the approach described above, a parameter, based on which the message is identified as containing SPAM, can be a unique identifier of the sender. As an example of such unique identifier for email is the email address of the sender. For SMS and MMS messages, such a parameter could be the mobile telephone number of the sender. Note also that on the Internet there are openly accessible resources that are routinely updated and contain information listing unique identifiers of senders of SPAM messages. Therefore, in this example, the information in the filter rules database 330 can also be updated by using a search robot (sometimes called "crawlers")—i.e., programs intended for scanning webpages on the Internet with the objective of searching for specific information, and adding it to the database 330.

Figure 5:
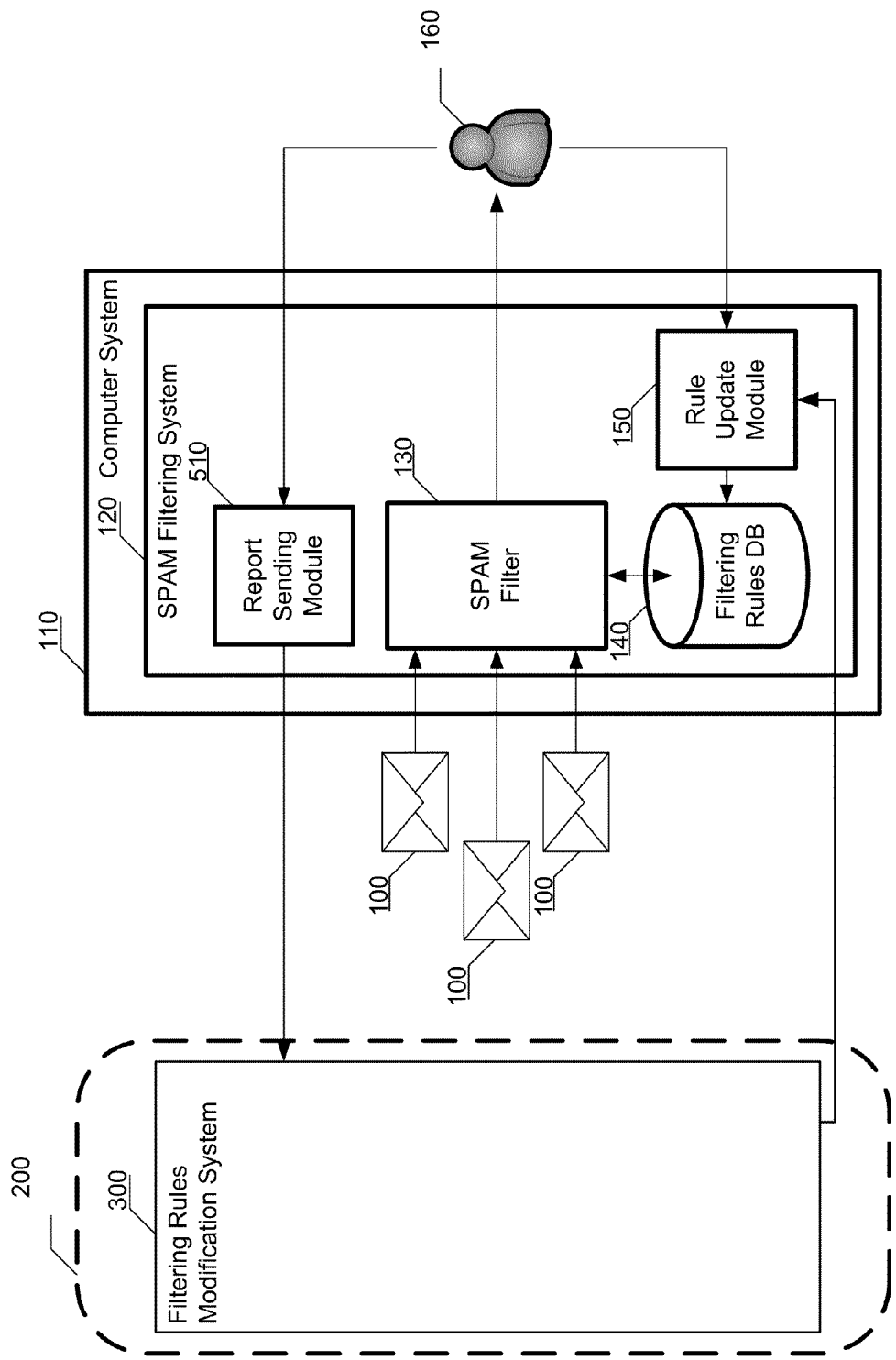
FIG. 5 illustrates an architecture of a SPAM filtering system of a client side, in accordance with the exemplary embodiment.

FIG. 5 illustrates architecture of a SPAM filtering system on a client site. Messages 100 are received into the SPAM filter 130 of the SPAM filtering system 120 installed on the computer system 110 of the user 160. The SPAM filter 130 determines parameters of received messages 100 and checks these parameters against parameters stored in a filtering rules database 140. If the parameters of the message 100 match the parameters from the database 140, a certain action (e.g., message deletion or quarantine) is taken against the message 100.

If match is not found, the message 100 is sent to the user 160. However, if the message 100 containing SPAM is not detected by the SPAM filtering system 120 and the message is sent to the user 160, the user 160 can change filtering rules in the database 140 by rule update module 150. The user 160 can also send a SPAM report to the filtering rules modification system 300 within the cloud service 200 via a report sending module 510.

According to the exemplary embodiment, the filtering rules modification system 300 makes a decision whether a given message contains SPAM based on the SPAM report from the user 160 and reports from the other users of the cloud service 200. Accordingly, the common rules filtering database 330 is updated based the filtering rules modification system decision. Subsequently, these changes are migrated into the filtering rules databases 140 of each user 160.

Note that SPAM contains advertisements, and some users 160 might want to see them. Therefore, the rules from the common filtering rules database 330 and from the filtering rules database 140 might not be acceptable by the user 160. Therefore, each user 160 can individually change rules in the filtering rules database 140 of its own SPAM filtering system 120 via the rule update module 150. The rules in the filtering rules database 140 that have been changed by the user 160 in an individual manner (via the rule update module 150) have priority over the rules that had been migrated into the database 140 from the common filtering rules database 330.

Alternatively, the filtering rules database 140 and the common filtering rules database 330 can have identical filtering rules for different categories of SPAM messages. Examples of SPAM categories can be accounting services, management courses, audit services, pharmaceutical products, etc. The user 160, who is interested in receiving SPAM messages of a particular category, can change the filtering rules in the database 140 for the entire category of messages (instead of just one message) via the rule update module 150.

Alternatively (or in addition to), a user reputation weight is calculated for each category of SPAM messages. Thus, the report processing module 310 changes the user reputation weight for a particular category of messages based on reliability of user report indicating that the messages of this category contain SPAM. This approach allows for determining users that are most competent in detecting SPAM in each category of messages.

It also should be noted that today, in addition to text-type SPAM messages, there is also so-called "voice spam", which is a spam variety where commercial messages and similar type of information is sent to users who do not wish to receive it, through mobile telephones and landline telephones, as well as sometimes through IP telephony, for example through the use of VOIP clients from SKYPE, ICQ, QIP, mail.ru, Yahoo instant messenger, and so on. Since voice spam is normally sent in real time, the only realistic mechanism for dealing with such spam is blocking the call from the sender, if the sender's identifier is listed in a blacklist Such a unique identifier, in this case, can be the telephone number of the caller, or a unique identifier that the sender uses for his VOIP connection.

As one example of how the present invention can be implemented, when the computer 110 supports voice-type connections, such as VOIP, voice spam can also be filtered. In this case, reports sent by senders who receive such voice spam, can contain unique identifiers of voice spam senders. Based on the number of such reports, as they relate to voice spam and a particular unique sender identifier, as well as based on the parameters described above, relating to the users knowledge and reputation, the processing means 310 can calculate the spam weight of the voice spam for the unique identifier of the sender. If the calculated spam weight is higher than a threshold, the sender's unique identifier would be added to the blacklist, which is stored in the filtering rules database 330. The spam filtering system 120, installed on the computer 110, will filter the voice spam by blocking the incoming calls from subscribers, whose unique identifiers are found in the blacklist Note also that analogous to the approach described above, the updating of the blacklist can also be done through the use of search bots (crawlers).

The system depicted in FIGS. 3 and 4 may not allow for estimating a real level of user knowledge. This problem is corrected by the system depicted in FIG. 6 that illustrates a system for estimation of user reputation. This system allows for in-depth estimation of user knowledge that is more comprehensive than the estimation based on reliability of that user's SPAM reports. According to the exemplary embodiment, user reputation can also be estimated based on data reflecting anti-SPAM actions performed by the user on its own computer system.

For example, such data can be a level of configuration details of user anti-SPAM filter, data related to duration of use of the anti-SPAM filter or data reflecting the time period that the user took from the point of opening a message until sending the SPAM report about the message. Also, user reputation can be estimated based on the information that characterizes user anti-SPAM activity indirectly. Such information can be, for example, information about a number of messages sent and received by the user.

Furthermore, SPAM filtering system is a part of user AV application that includes other modules, such as, for example, a file anti-virus, a web anti-virus, a firewall, an anti-phishing module, an update module, etc. Thus, user knowledge and competence can be determined by user actions that involve the entire set of modules of the AV application. An example of such information can be a level of configuration detail of the AV application, duration of use of the AV application or a number of detected malware objects.

Additional data for estimation of user reputation can be a level of detail of computer system configuration, duration of use of the computer system, dynamic characteristics of keyboard usage, installed applications, network settings, non-default port settings, and data reflecting websites visited by the user. The reputation rules can be configured according to user characteristics. For example, the reputation rules database can contain two rules:

if the user computer has a children's game installed, the user reputation weight is reduced by 5 (out of, for example, 100 maximum—note that the reputation weight can change both in absolute terms—e.g., by 5, or in relative terms, i.e., percentages, or differentially—e.g., if a user has a current reputation weight of 90, and a normal increase would be 5, in his case, the increase would be 2. As a further alternative, satisfying a particular rule can mean that the reputation is set to 100);

if the user computer has some software development tools installed, the user reputation weight is increased by 10.

If a user A has a game installed and a user B has development tools, then the reputation weight of the user B will be higher than that of the user A by 15. Note that both user A and B can work on the same computer system under different accounts. However, if the game and the development tools are installed and used by the same user, the reputation weight of this user will be calculated as +10−5=5.

According to the exemplary embodiment, the user reports that have higher reputation weight increase the SPAM weight of message more significantly than those with the low weight. In other words, a report from the user with the reputation weight 92 increases the SPAM weight of message more than the user report with the reputation weight 21.

A threshold is used, so the reports of users, having the reputation weight below the threshold, are not taken into account for calculating message SPAM weight. The reports from other users are factored in as described above. For example, the threshold is set at 50. User A reputation weight is 21, user B is 51, and user C is 93. Then, the report of the user A falls below the threshold and is not considered. The report from the user B will increase the message SPAM weight more significantly than the report from the user C.

Alternatively, the reports from all users with the reputation weight below the threshold are not considered in calculation of the message SPAM weight and the reports from the other users are considered equally.

Figure 6:
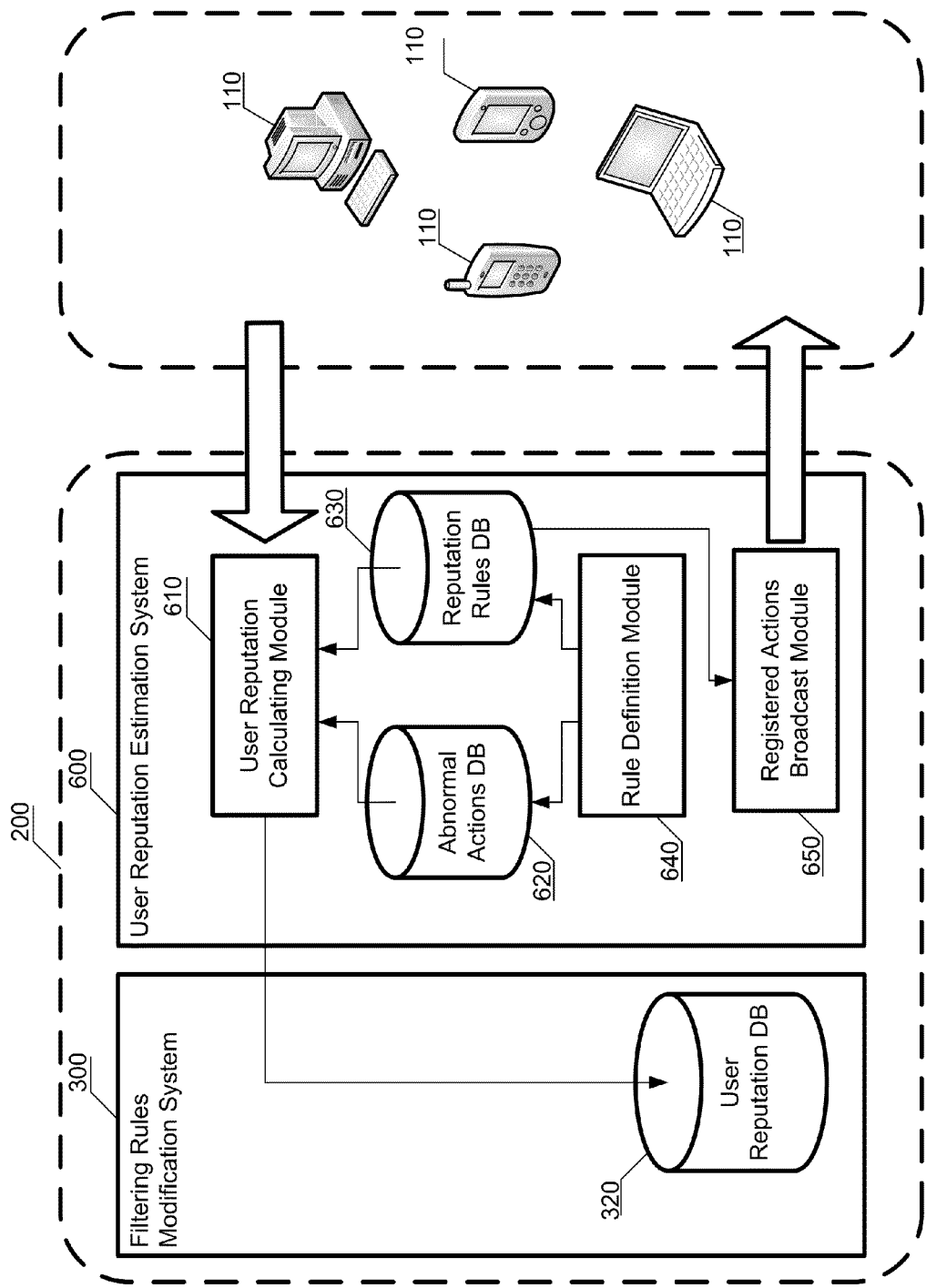
FIG. 6 illustrates a system for estimation of user reputation, in accordance with the exemplary embodiment.

Thus, in the exemplary embodiment, in order to have the most objective estimation of user reputation, all data reflecting user activities related to computer security is taken into account. A user reputation estimation system is depicted in FIG. 6.

The user reputation estimation system 600 is a part of the cloud service 200. The user reputation estimation system 600 includes a user reputation calculation module 610. The user reputation calculation module 610 receives notifications of actions performed by users of computer systems 110 that act as clients of the cloud service 200. The notifications contain a user ID and data reflecting user actions needed for estimation of the user reputation. The user ID can be identification of the AV application or of the SPAM filtering system, user licensing for certain applications data, as well as, an international identifier of mobile equipment (if the system is used on a mobile device).

The notifications can be sent from computer systems 110 right after users perform certain actions or it can be sent periodically after a set time interval. After the notification of action is received, the user reputation calculation module 610 checks the user action described in the notification against an abnormal action database 620. The abnormal action database 620 contains data reflecting some "cheating" actions that users can perform in order to increase their reputation. An example of such actions can be an excessive user activity involving the AV application. Examples of other "cheating" actions are discussed below.

Therefore, as one option, the user actions that match data in the abnormal actions database 620 are not taken into account for calculation of user reputation by the user reputation calculation module 610, if the number of such user actions is below a threshold. Then, the user reputation weight is calculated based on all other (i.e., normal) user actions. A reputation rules database 630 contains data reflecting appropriate user reputation changes that need to be made based on particular actions. Alternatively, any evidence of abnormal activity may be used to affect the reputation of the user.

The user reputation calculation module 610 looks for data corresponding to the user actions described in the received notification in the reputation rules database 630. If a corresponding reputation rule is found, the user reputation calculation module 610 updates user reputation weight in the user reputation database 320 within the filtering rules modification system 300 according to the reputation rule.

An administrator of the user reputation estimation system 600 can update the reputation rules in the reputation rules database 630, as well as, data in the abnormal actions database 620 using a rule definition module 640. A registered action broadcast module 650 retrieves data from the reputation rules database 630 in order to inform users' systems 110 about what actions need to be registered in the notifications.

Figure 7:
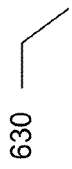
FIG. 7 illustrates a user reputation database, in accordance with the exemplary embodiment.

FIG. 7 illustrates an exemplary user reputation database 630. The rule definition module 640 assigns a certain category and a rule to each user action (related to AV processing). Then, the user reputation weight in the user reputations database 320 can be either increased or reduces by a certain value according to the rule.

Figure 8:
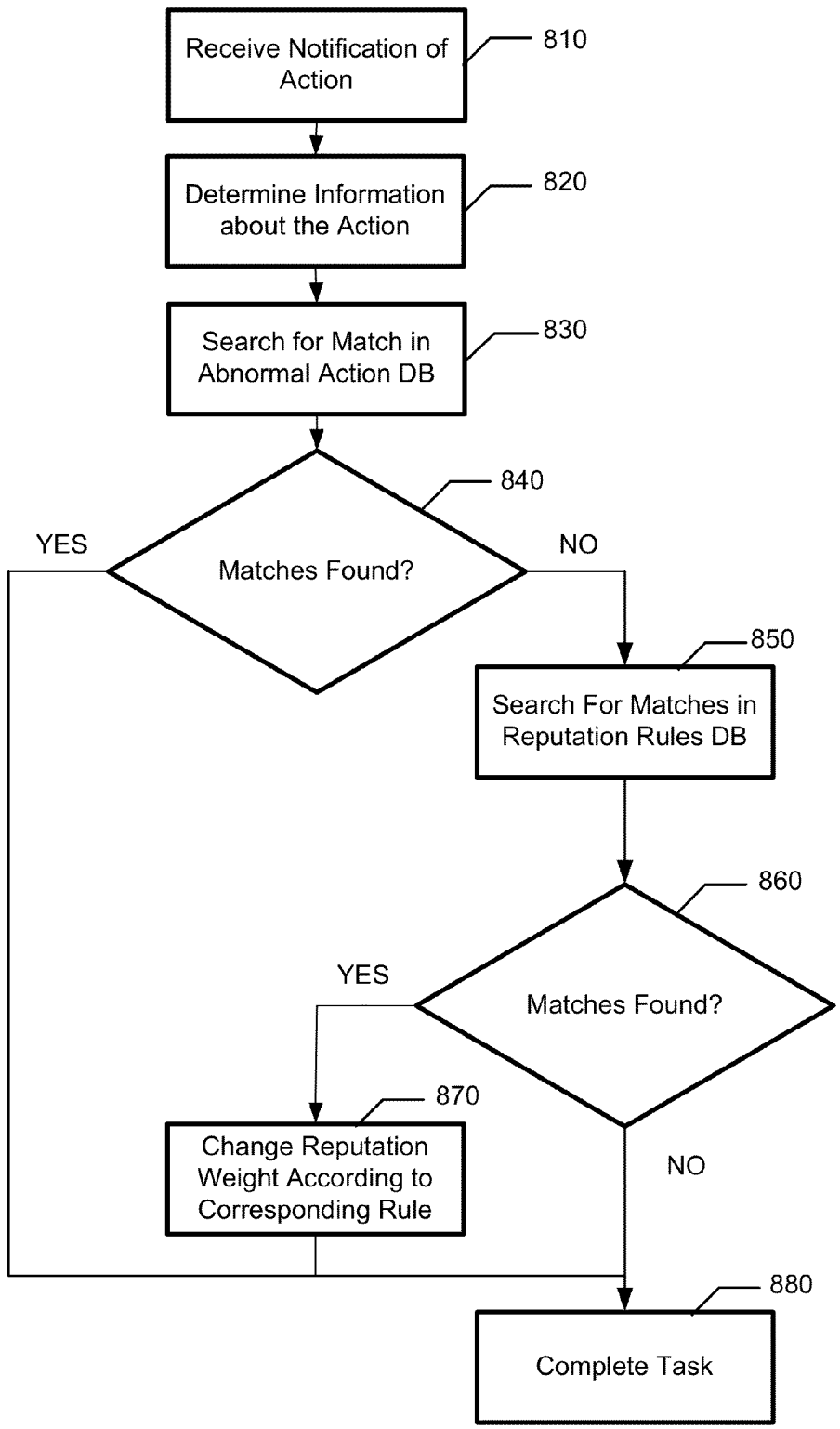
FIG. 8 illustrates a flow chart of a method for estimation of user reputations, in accordance with the exemplary embodiment.

FIG. 8 illustrates a flow chart of a method for estimation of user reputations. Notification of user action is received in step 810. For this exemplary case the notification contains only information about one user action. Note that, if the notification contains information about plurality of user actions, the steps of the method are repeated as a cycle.

In step 820, the information about the user action is determined. Then, the process searches for a matching user action in the abnormal actions database in step 830. If the match is found in step 840, the task is completed in step 880. If the match is not found in step 840, the process searches for a matching user action in the reputation rule database in step 850. Then, if the matching rule is found in step 860, the reputation weight is changed according to the rule found in step 870. The task is completed in step 880.

Figure 9:
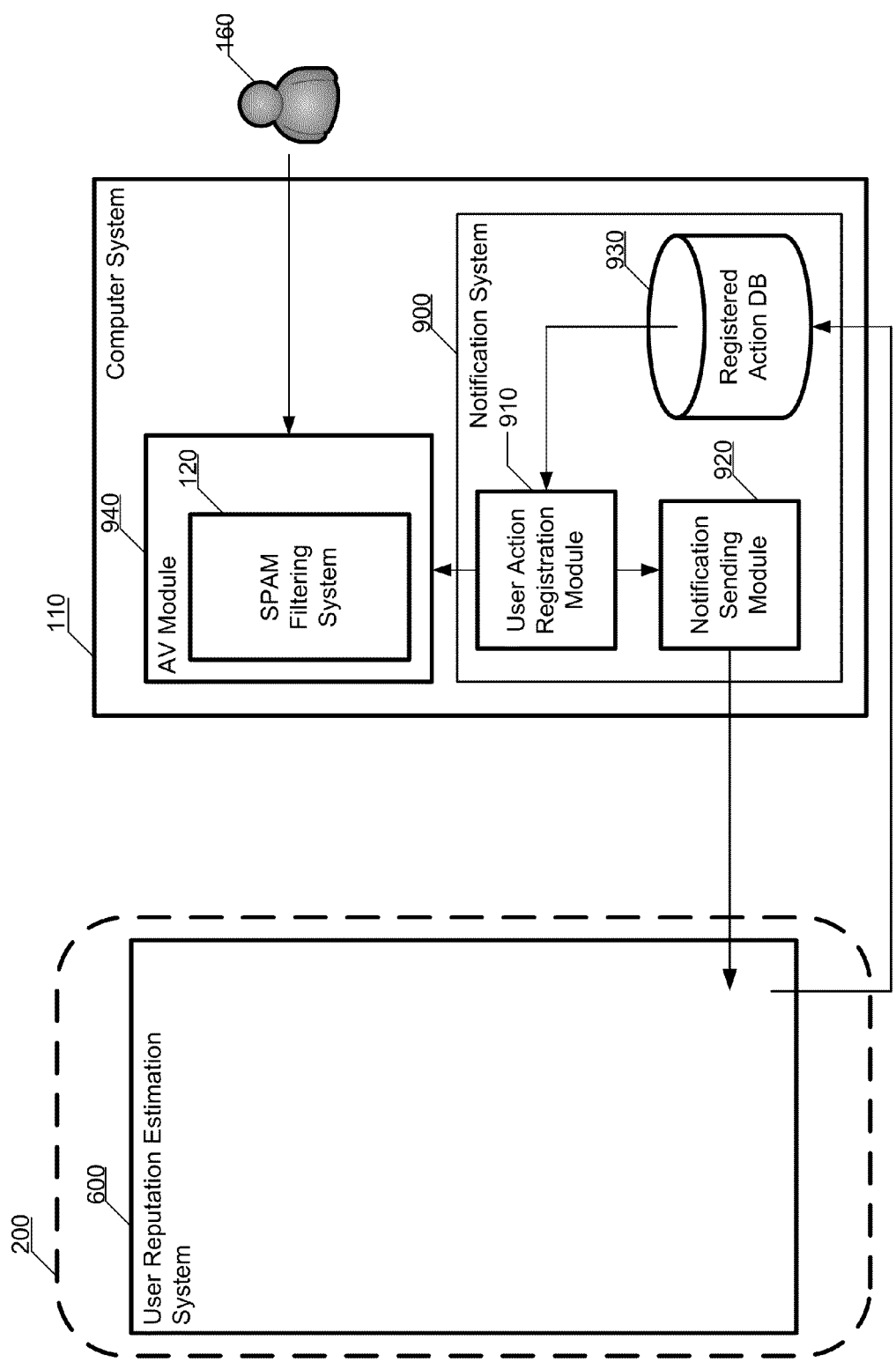
FIG. 9 illustrates a system for sending notifications implemented on a user computer that acts as a client of a cloud service.

FIG. 9 illustrates a system for sending notifications implemented on the user computer 110 that acts as a client of the cloud service 200. A notification system 900 is implemented on a computer system 110 of user 160 that is a client of the cloud service 200. The notification system 900 includes a database of registered user actions 930, which receives (for storage) from user reputation estimation system 600, the user action that need to be registered for notifications.

A user action registration module 910 accesses a registered actions database 930 and monitors actions of the user 160 that the user performs while working on the computer system 110 and, in particular, with an AV application 940. The SPAM filtering system 120 can be included into the AV module 940 or it can be implemented as a separate module. If the user 160 performs an action that has a corresponding data in the registered actions database 930, a user action registration module 910 registers this action and passes action-related information to a notification sending module 920.

The notification sending module 920 forms a notification of user actions based on the received information and sends the notification to the user reputation estimation system 600. According to the exemplary embodiment, the factors that influence the user reputation are:

- launching addition modules of the AV application that are turned off by default;
- increasing security configuration settings for each of the modules;
- increasing frequency of scheduled AV scans;
- increasing frequency of AV database updates;
- periodic update of anti-SPAM and parental control data;
- duration of use of the AV application by the user;
- system scan requests;
- scans of the external media;
- frequency of detection of malware on a user system;
- employment by the user of additional browser applets that increase safety of surfing (e.g., WOT indicates the site reputation);
- changes in browser setting in order to increase security (e.g., turning off script execution, activation of the pop-up blockers, activation of phishing filters, limiting ActiveX controls, and turning off saving of cookies and passwords);—themes of visited sites;
- and
- types of applications launched on the user system (i.e., games, multi-media applications, software development tools, compilers, etc.).

Examples of abnormal user actions (i.e., evidence of falsified user reports made for increase of the user rating) are:

- user categorizes messages too fast (for example, on the order of several milliseconds, or less than a quarter of a second—on the theory that a human being cannot read and categorize messages faster than he can understand their nature—the "too fast" parameter can also be based on an average time it takes users to categorize messages);
- user categorizes messages too often, for example, between 1 and 10 messages per second, with the higher end of the range definitely indicating an anomaly;
- user categorizes messages at odd or unusual times (for example, at night, or between 1 AM and 4 AM);
- keyboard keys are not pressed and no mouse clicks are detected while user performs some actions;
- the application is not activated, but user sends the reports indicating its use;
- the AV interface is not open, but user sends the reports indication the use of the AV application;
- AV scans are not performed, but user reports indicate otherwise;

applications are not launched (based on information from a Task Manager), yet user reports indicate launching of the applications;

network attacks are not detected by the firewall, yet user reports indicate otherwise; and AV scans requested too frequently (with short times between the AV scans, such as less than half an hour between scans, or starting an AV scan before the current one is completed) and without reasonable causes is indicative of an anomaly.

Based on the above listed factors and abnormal actions, the most competent users can be determined for modification of filtering rules defined by the SPAM filtering system 120. Modifications are based on the reports from these users. The updated rules are provided to other clients of the cloud service 200.

Figure 10:
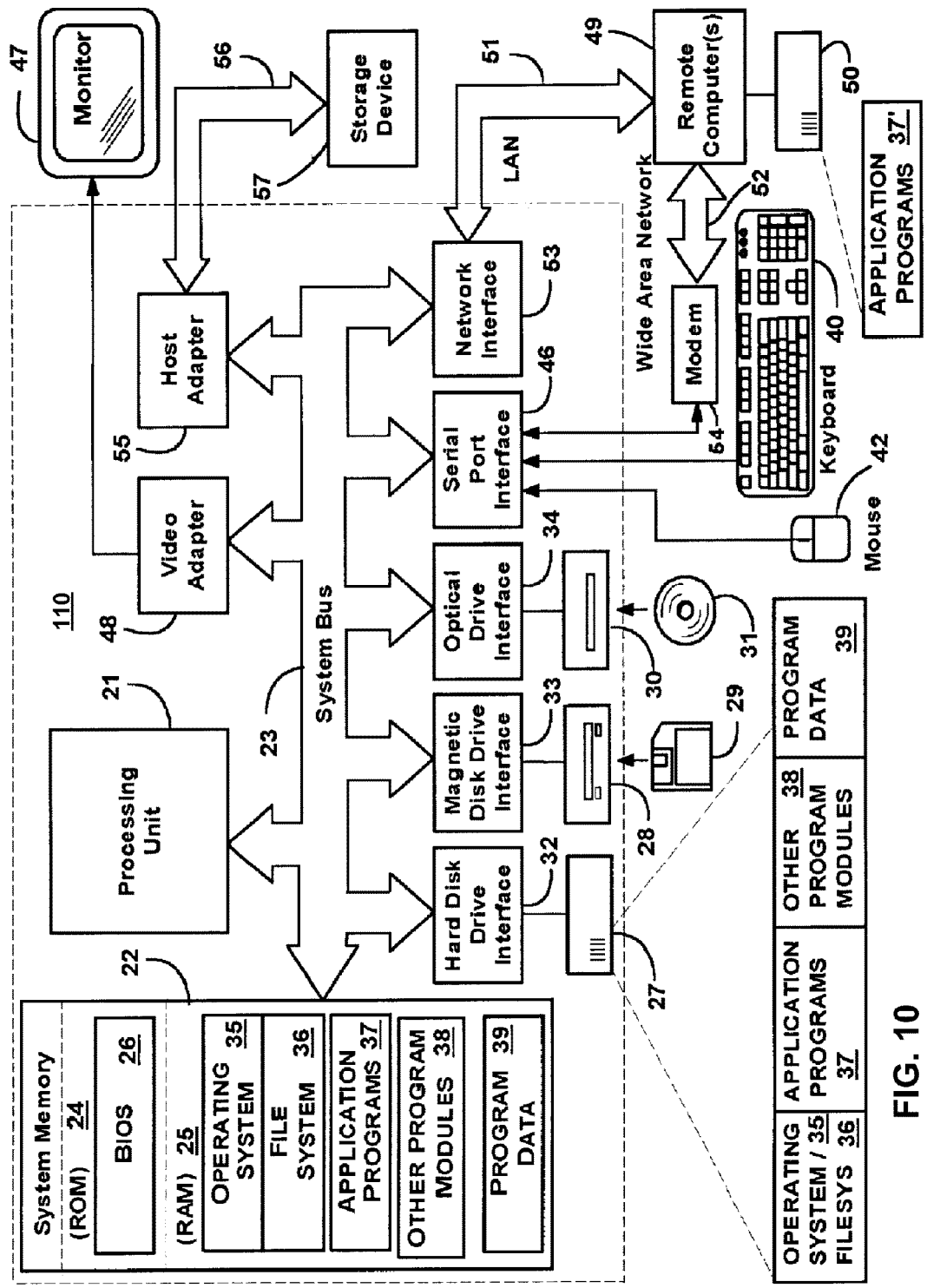
FIG. 10 illustrates a schematic of an exemplary computer system that can be used for implementation of the invention.

With reference to FIG. 10, an exemplary system for implementing the invention includes a general purpose computing device in the form of a computer 110 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 110, such as during start-up, is stored in ROM 24.

The computer 110 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 110 includes a file system 36 associated with or included within the operating system 35, one or more application programs 37, other program modules 38 and program data 39. A user may enter commands and information into the computer 110 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 110 may operate in a networked environment using logical connections to one or more remote computers 49. The remote computer (or computers) 49 may be another computer, a server, a router, a network PC, a peer device or other common network node, and typically includes many or all of the elements described above relative to the computer 110, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 110 is connected to the local network 51 through a network interface or adapter 53. When used in a WAN networking environment, the computer 110 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 110, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for effective SPAM filtering based on user reports, while taking into account users' reputations.

It should also be appreciated that various modifications, adaptations and alternative embodiments thereof may be made within the scope and spirit of the present invention. The invention is further defined by the following claims.

What is claimed is:

1. A system for updating filtering rules for messages received by a plurality of users, the system comprising:
    a filtering rules database storing filtering rules for the plurality of users;
    means for distributing the filtering rules to the plurality of users;
    a user reputation database comprising a reputation weight for each of the plurality of users receiving messages, wherein the user reputation is based on (a) duration of use of the antivirus application by the user, (b) types of applications installed on the user's system and (c) periodic update of anti-SPAM and parental control data by the user;
    means for receiving and processing of user reports that indicate that a message belongs to a particular category, wherein the means for receiving
    (i) calculates a message weight in its category based on a number of reports received from multiple users and reputation weights of those users,
    (ii) decides whether the message belongs to the particular category if the message weight exceeds a predefined threshold,
    (iii) updates the filtering rules in the filtering rules database based on the deciding, and (iv) distributes the updated filtering rules from the filtering rules database to the plurality of users using the means for distributing, wherein the reputation weight of each user who sent the report is reduced for a particular category if the message does not belong to the particular category.

2. The system of claim 1, wherein the means for receiving and processing is in communication with modules installed on computers of the plurality of users, each module comprising:

means for sending the user reports;
a local database of filtering rules;
a filter that filters incoming messages based on the filtering rules in the local database; and
means for modifying the filtering rules in the local database based on the updated filtering rules.

3. The system of claim 1, further comprising changing the filtering rules in the local database based on user input.

4. The system of claim 1, wherein the user reputation database is connected to a means for calculating reputation weights of the users, the means for calculating comprising:

means for setting rules defining user actions, based on which the reputations weights are changed when a user performs the action;
a database of the user actions and corresponding modifications to user reputation weights;
means for calculating reputation weights that receives notifications of the user actions and changes the reputation weight of the corresponding user based on the modifications;
means for distributing of user actions needed to register the users with the system.

5. The system of claim 1, further comprising a database of anomalous user actions that negatively affect the reputation of the user.

6. The system of claim 1, wherein the particular category includes spam messages.

7. The system of claim 1, wherein the reports from users that have higher reputation weight increase the message weight in its category to a greater degree than reports from users with a lower reputation weight.

8. A computer-implemented method for updating filtering rules for messages received by a plurality of users, the method comprising:

storing filtering rules for the plurality of users receiving messages in a filtering rules database; distributing the filtering rules to the plurality of users;
storing a reputation weight for each of the plurality of users receiving messages in a user reputation database; and
receiving and processing of user reports that indicate that a message belongs to a particular category, wherein the means for processing includes
(i) calculating a message weight in its category based on a number of reports received from multiple users and reputation weights of those users, wherein the reputation weights are based on (a) duration of use of the antivirus application by the user, (b) types of applications installed on the user's system and (c) periodic update of anti-SPAM and parental control data by the user;
(ii) deciding whether the message belongs to the particular category if the message weight exceeds a predefined threshold,
(iii) updating the filtering rules in the filtering rules database based on the deciding, and
(iv) distributing the updated filtering rules from the filtering rules database to the plurality of users.

9. The method of claim 8, further comprising calculating a message weight of a particular message in the particular category using any of:

fuzzy logic;
emulation;
and
base vector method.

10. The method of claim 8, wherein the user reputation is based on any of:

employment by the user of additional browser applets;
browser security settings; and
frequency of detection of malware on a user system.

11. The method of claim 8, wherein the receiving and processing further comprises, on a client side:

sending the user reports;
maintaining a local database of filtering rules;
filtering incoming messages based on the filtering rules in the local database; and
modifying the filtering rules in the local database based on the updated filtering rules.

12. The method of claim 8, further comprising changing the filtering rules in the local database based on user input.

13. The method of claim 8, wherein the calculating of the reputation weights of the users includes:

setting rules defining user actions, based on which the reputations weights are changed when a user performs the action;
maintaining a database of the user actions and corresponding modifications to user reputation weights;
distributing rules defining user actions needed to register the user actions on client side;
registering user actions on client side based on rules defining user actions;
sending notifications of registered user actions;
calculating reputation weights based on received notifications of the user actions and changing the reputation weight of the corresponding user based on the modifications.

14. The method of claim 8, further comprising storing, in a database of anomalous user actions, user actions that negatively affect the reputation of the user.

15. The method of claim 14, wherein a number of anomalous user actions needs to exceed a threshold before negatively affecting the reputation of the user.

16. The method of claim 14, wherein the anomalous user actions are any of:

categorizing messages too often;
categorizing messages at unusual times; and
performing actions without using keyboard or a mouse.

17. The method of claim 14, wherein the anomalous user actions are any of:

reporting employment of AV application when AV interface is not open; and
reporting AV scans that are not performed.

18. The method of claim 14, wherein the anomalous user actions are reporting launch of applications that are not running.

19. The method of claim 8, further comprising storing, in the database of anomalous user actions, those user actions that do not affect the reputation of the user.

20. The method of claim 8, further comprising changing a user reputation based on reliability of user reports sent previously by that user.

21. The method of claim 8, further comprising calculating a separate user reputation for each message category.

22. The method of claim 21, wherein the processing means calculates a message weight for each message based on a number of user reports and user reputations in that message category.

23. The method of claim 8, wherein the processing step only uses those user reports received from users with a reputation weight above a pre-defined threshold.

24. The method of claim 8, wherein the distributing only distributes updated filtering rules based on a subset of users with the highest reputation weights.

25. The method of claim 8, wherein the particular category includes spam messages.

26. The method of claim 8, wherein the particular category includes voice spam messages.

27. The method of claim 26, wherein the user reports include a unique identifier of a sender of the voice spam messages, and wherein the filtering rules database stores unique identifiers of a blacklist of senders of voice spam, and wherein the means for processing adds senders to the blacklist when their spam weight exceeds a predefined threshold.

28. The method of claim 8, wherein the rules in the filtering rules database are updated based on output of search bots that scan web pages for information about spam senders.

29. The method of claim 8, wherein the user reputation is based on any of:
   increasing security configuration settings for each module;
   increasing frequency of scheduled AV scans; and
   increasing frequency of AV database updates.

\* \* \* \* \*